United States Patent
Lidak

(10) Patent No.: US 6,619,585 B1
(45) Date of Patent: Sep. 16, 2003

(54) HELICOPTER SINGLE-BLADE ROTOR

(76) Inventor: Vladimiro Lidak, Via Principe Eugenio, 106, 00100-Roma (IT)

( * ) Notice: Subject to any disclaimer, the term of this patent is extended or adjusted under 35 U.S.C. 154(b) by 0 days.

(21) Appl. No.: 09/857,140

(22) PCT Filed: Dec. 1, 1999

(86) PCT No.: PCT/IT99/00393

§ 371 (c)(1),
(2), (4) Date: Jun. 1, 2001

(87) PCT Pub. No.: WO00/32468

PCT Pub. Date: Jun. 8, 2000

(30) Foreign Application Priority Data

Dec. 3, 1998 (IT) .................................. MC98A000110

(51) Int. Cl.[7] .............................................. B64C 27/54
(52) U.S. Cl. ................................. 244/17.25; 244/17.11
(58) Field of Search ........................... 244/17.25, 17.11; 416/19, 149

(56) References Cited

U.S. PATENT DOCUMENTS

| | | | | |
|---|---|---|---|---|
| 2,247,034 A | * | 6/1941 | Pitcairn |
| 2,265,366 A | * | 12/1941 | Hafner |
| 2,371,160 A | * | 3/1945 | Everts |
| 2,471,687 A | * | 5/1949 | Holmes |
| 2,475,318 A | * | 7/1949 | Gluhareff |
| 2,742,095 A | * | 4/1956 | Pitcairn et al. |
| 2,944,610 A | * | 7/1960 | Gluhareff |

* cited by examiner

*Primary Examiner*—Tien Dinh
(74) *Attorney, Agent, or Firm*—Armstrong, Westerman & Hattori, LLP

(57) ABSTRACT

The present invention relates to a single-blade main rotor for helicopters designed so that the component of the blade lift normal to the rotational axis of the rotor is compensated by the inertial force obtained through the self-adjustment of the position of the rotor centre of mass relative to its rotation axis, it being provided that the position of the rotor centre of mass is determined by the coning angle of the blade.

6 Claims, 2 Drawing Sheets

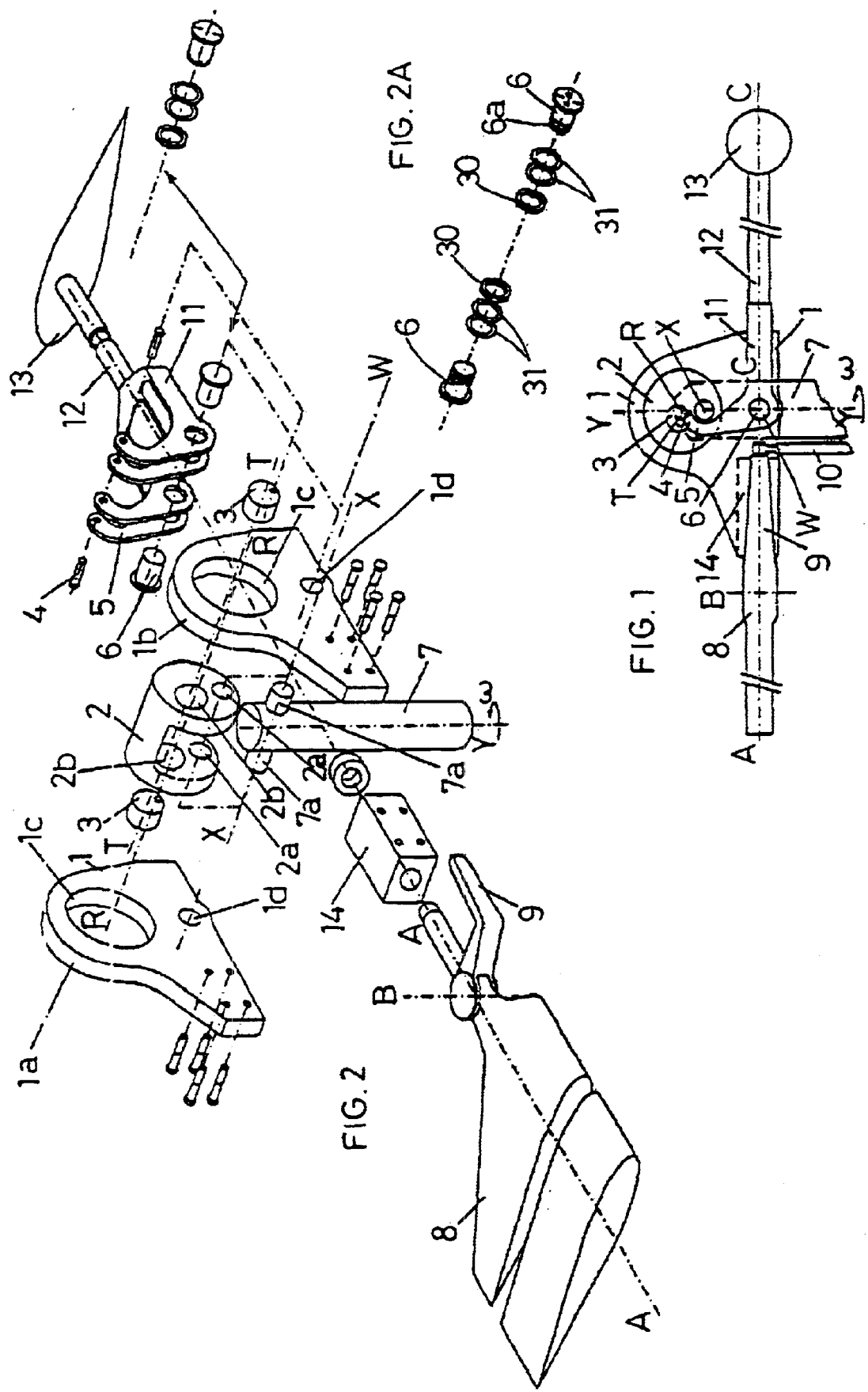

HELICOPTER SINGLE-BLADE ROTOR

The present patent application for industrial invention relates to a single-blade rotor designed to be used as main rotor in helicopters and other types of rotorcraft. The rotor supports the helicopter during hovering and translated flight and, by means of its controls, allows execution of the manoeuvres typical of this type of vehicle.

To this end, helicopters are usually equipped with vertical axis rotors provided with two or more identical blades joined by hinges or similar means to a central propeller hub, which is in turn fixed to the upper end of a vertical mast driven by a system for the transmission of the rotary motion connected to one or more engines.

When maintained in rotation at the appropriate speed, the blades support the helicopter because of the upward lift produced as a consequence of the relative air speed with respect to the aerodynamically profiled blades. Moreover, the blades are subject to the weight force and, due to rotation, to the centrifugal force. The balance of all these forces and their moments with respect to the joints of the blades to the rotor hub and the mast, to which the weight of the rotorcraft is applied, determines the geometrical position of the blades, which, with respect to the plane orthogonal to the rotation axis, are directed upwards with a normally small coning angle. The entity of the total lift is adjusted by the pilot through the collective control lever that acts on the blade pitch by means of rods, levers, and rotating mechanisms connected with suitable pitch horns located on the hub of each blade, coupled in a rotary way to the rotor hub, with rotation axis sensibly parallel to its own longitudinal axis.

The control mechanisms allow the pilot to change the pitch of each blade with the cyclic control lever, with respect to the average value determined by the collective control, in order to create pitch differences symmetrical to this average value, in positions diametrically opposed to the rotational axis, inducing the rotor disk to tilt, thus causing the helicopter to move in the corresponding direction of tilting.

Rotors are usually manufactured according to multiple solutions, all of which, in order to guarantee correct operation, require the blades to be identical in terms of entity and mass distribution and as similar as possible in terms of shape and aerodynamic behaviour, while the joints at the rotor head and the kinematic chain that controls their pitch must have the same characteristics for all the blades of the rotor. Therefore, in order to maintain acceptable performance, such rotors require frequent maintenance works of blades tracking and balance, involving complicated procedures and methods and using special equipment.

In such multi-blade rotors, the lifting surface is divided between the blades of the rotor. With the same diameter and solidity, in a multiblade rotor each blade has a shorter mean chord which, for a given rotor tip, results in a lower value of the ratio between the product of the speed multiplied by the chord and the kinematic viscosity of the air (Reynolds Number). Since this lower value results in an increased blade drag coefficient for a given lift, it is therefore convenient to reduce the number of blades.

Moreover, it must be stressed that the rotation of each lifting blade produces a wake that can disturb the following blade, especially during hovering or low speed flight, with negative effects on its performance. The time interval between the passage of one blade in a disk area and the following as the number of rotor blades decreases, under given conditions, thus reducing the perturbation of the air in which the rotor operates.

In view of the above considerations, whenever possible, the adoption of a reduced number of blades can give aerodynamic advantages over similar rotors with a higher number of blades. Moreover, the reduction in the number of blades decreases the number of components and moving parts, leading to the simple bi-blade rotor with suspended hub connected to the mast with a horizontal hinge normal to the rotation axis.

Experiments have also been carried out with single-blade rotors in which the blade is balanced by a counterweight, but the difficulties in obtaining an acceptable balance between the forces and moments acting on such rotors under various operating conditions have not allowed the application and diffusion of such solutions.

The main purpose of the present invention is to overcome the inconveniences found in multi-blade and single-blade helicopters of known type, by means of a main rotor system for helicopters consisting of a single blade with central hub, a counterweight and balancing devices, having high flexibility and adaptability and characterised by easy construction, safe use and efficient operation.

The second purpose of the present invention is to create a single-blade rotor system, with working mechanism, in which the balance of the forces and moments acting on its parts is obtained by means of the reciprocal positions assumed by these parts as the coning angle of the single blade varies. The mechanisms controlling rotor balancing may be kinematic systems of known type, or other electromechanical or hydraulic devices. In any case, the horizontal component of the lift of the single blade is balanced by an identical opposed misbalance of centrifugal inertial forces, obtained by moving the rotor centre of mass relative to its rotation axis.

The third purpose of the present invention is to devise a rotor system, with control mechanisms, which does not require blades-tracking to ensure correct operation.

Last, but not least, another aim of the present invention is to design a mechanism capable of creating and maintaining a stable balance between the elements of the single-blade rotor during operation.

These and other aims, which will be highlighted in the description below, can all be achieved by the present invention.

Further characteristics and advantages of the invention will become more evident from the following description of three different embodiments, with reference to the enclosed drawings, which are intended for purposes of illustration and not in a limiting sense, whereby:

FIG. 1 is a schematic side view of the single-blade rotor and the devices used to maintain the balance, normal to the rotational axis of the rotor and the longitudinal axis of the blade according to a first embodiment;

FIG. 2 shows the same embodiment in an exploded axonometric view;

FIG. 2A is a view of the friction devices;

Figure 3:
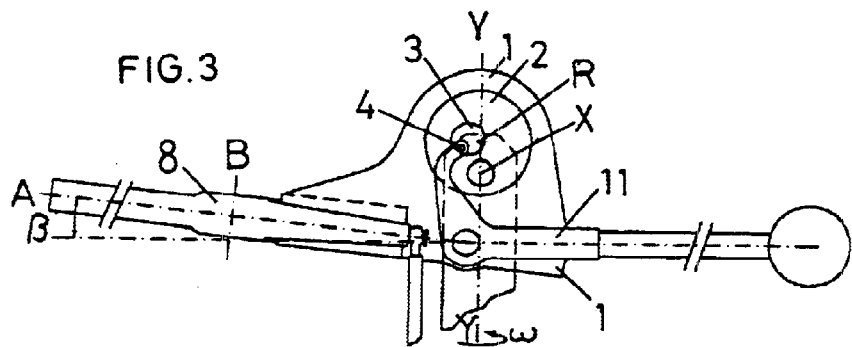
FIG. 3 and 4 are the same as FIG. 1, with the rotor blade inclined at a given coning angle.

The above figures show that the hub (1) of the rotor is joined to the support (14) of the blade (8) and made up of a vertical pair of plates (1*a* and 1*b*) symmetrical to the mast (7). The blade (8) is joined to the support (14) by a pitch hinge of known type, so that the blade can rotate around its longitudinal axis A—A, changing its geometrical pitch through joints and devices of known type, very similar to those generally used in helicopter rotors, applied to the pitch horn (9) of the blade, controlled by the rod (10).

The blade (8) is also fitted with a hinge, of virtual type also, with axis B—B in vertical and eccentric position with respect to the axis Y—Y of the mast which allows it to assume an angular position in the plane orthogonal to the rotational axis Y—Y, the said hinge being equipped with a damper or similar known devices.

The two plates (1a and 1b) making up the hub (1) contain two holes (1c) on the same axis R—R in which the cylindrical body (2) is coupled in a rotary way, the said body being centrally hollow and coupled in a rotary way also to the top of the mast (7) by means of a pair of opposing pins (7a), appropriately provided with friction devices 30, 31, with axis X—X normal to the same mast. The two opposite sides of the cylindrical body (2) also house two rotating coaxial cylinders (3) with axis T—T eccentric to the other axis R—R and X—X in a rotary way. The cylinders (3) are housed in an opposing coaxial pair of eccentric holes (2b) located in the aforementioned hollow body (2), which features another opposing coaxial pair of holes (2a), housing the pin (7a) mentioned above.

These cylinders (3) are in turn connected through revolving eccentric pins (4) to two pairs of identical levers (5) of the hub (11) of the counterweight, comprising the hub (11) placed at the end of an arm (12), featuring a profiled mass (13) at the other end.

The hub (11) is hinged in a rotary way to the rotor hub (1) by conaxic hinges (6) with appropriate friction devices, normal to the longitudinal axis of the counterweight; the joining of the centre of the pins (6) with the barycenter of the counterweight (13) determines a direction C—C. The hinges have threaded ends (6a).

More exactly, the hinges (6) are housed in two opposite coaxial holes located on the plates (1a and 1b) of the hub (1) along an axis W—W parallel to, but underlying, the axis X—X.

When the blade rotates without lift (FIG. 1), it rotates in almost the same horizontal plane as the counterweight, whose axis is formed by extending the axis A—A.

When the pilot increases the geometrical pitch of the rotating blade with the collective control, the lift inclines the blade upwards at a coning angle (β) such that the lift balances with the other forces and moments acting on the blade (FIG. 3). When executing this movement the blade (8) drags the hub (1) to which it is joined, which rotates around the axis (R—R) of the cylindrical body (2) at a corresponding angle (β).

The rotation also takes place with respect to the counterweight, which maintains its longitudinal axis orthogonal to the rotation axis Y'—Y' of the rotor. Thanks to this relative motion, the cylinders (3) linked by the revolving eccentric pins (4) to the levers (5) of the counterweight and the cylindrical body (2), coupled in a rotary way to the hub (1) rotate around each other, determining a new position of the hub (1) relative to the rotational axis Y—Y, along the direction C—C, passing through X—X that is, a different position of the rotor centre of mass with respect to the rotational axis. Since the lift is perpendicular to the blade, the coning of the blade involves a horizontal component of the lift, directed towards the centre of rotation. The horizontal force composes with the inertial forces affecting the blade and the counterweight. By appropriately dimensioning the relative positions of the pins (4), the hinges (6) and the axes R—R, X—X, T—T using known calculation methods of known type and considering the masses and positions of the relative barycentres of the blade, counterweight and the other components of the rotor and the mutual joints, it is possible, within the normal range of coning values to set up a sufficiently approximate and stable balance which remains constant on variating the coning angle and is practically independent of the rotational speed of the rotor, since the forces that act on the rotor—whether due to lift or inertia—all proportional to the square of the rotational speed.

Figure 4:
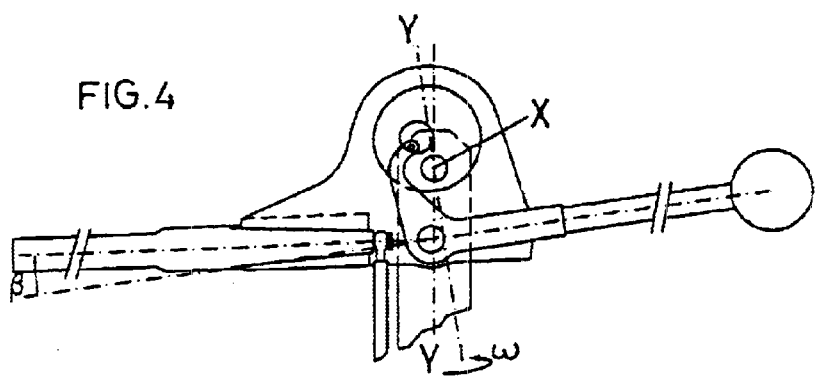

The pitch variations, caused by the pilot acting on of the cyclic control from the pilot or determined by the asymmetry of the air flow investing the blade during horizontal flight, cause the rotational plane of the counterweight to tilt, with consequent tilting of the entire rotor around the axis X—X, as illustrated in FIG. 4, thus allowing the helicopter to be moved and controlled.

Figure 5:
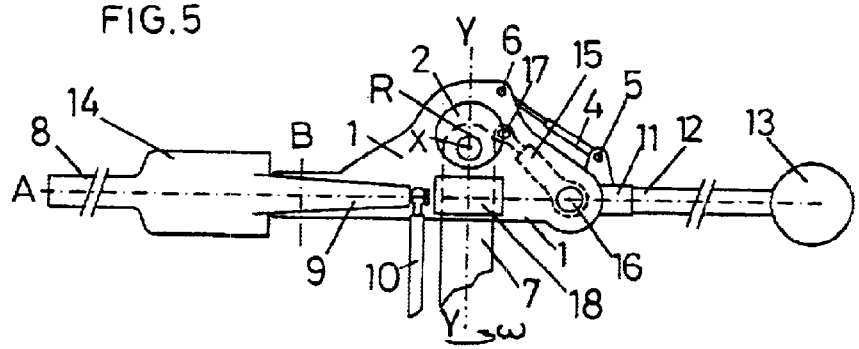
FIG. 5 is a schematic side view of the single-blade rotor and the devices used to maintain the balance, normal to the rotational axis of the rotor and the longitudinal axis of the blade according to a second embodiment.

FIG. 5 illustrates a second embodiment—but not last—of the present invention in which the displacement of the rotor centre of mass relative to the rotational axis Y'—Y' and along the direction C—C, in order to balance the horizontal component of the lift, is carried out by an electromechanical actuator (15) acting between pins (16) and (17), respectively joined to the hub (1) of the rotor and the cylindrical body (2), which is in turn coupled in a rotary way with the hub, electrically controlled by a control box (18) according to the value detected and transmitted with electrical signals by the telescopic detection device (19) of known type of the relative distance assumed by the points (20) and (21), in relation to which the detector (19) is respectively hinged to the hub (11) of the counterweight and the hub (1) of the rotor, as the coning of the blade (8) changes.

In fact, the control box is designed and programmed using known calculation methods and construction systems, so that for each coning value of the blade, as measured by the detector device (19), the actuator (15) causes the cylindrical body (2) to rotate around the hub (1) so that the rotor centre of mass relative to the rotation axis, passing through X—X, assumes the correct position to ensure balance between the aerodynamic and inertial forces acting on the rotor.

Figure 6:
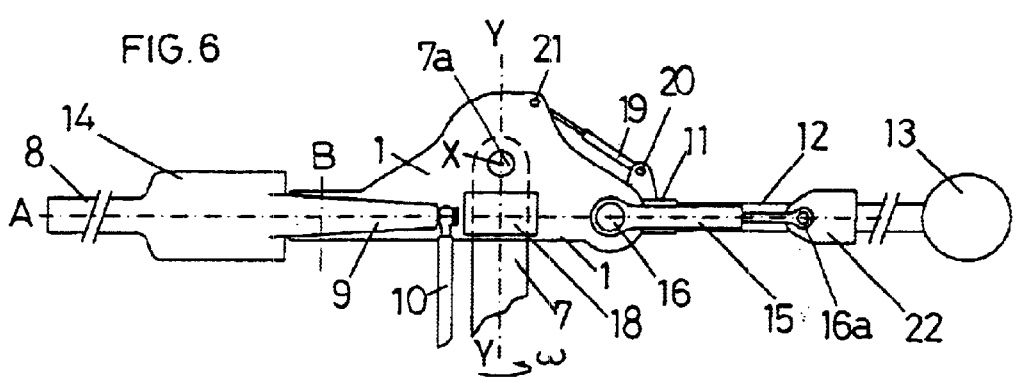
FIG. 6 is a schematic side view of the single-blade rotor and the devices used to maintain the balance, normal to the rotational axis of the rotor and the longitudinal axis of the blade according to a third embodiment.

FIG. 6 illustrates a third embodiment of the present invention, in which the actuator (15) controlled by the control box (18) radially displaces the mobile mass (22) that slides on the rod (12) of the counterweight, according to the coning angle measured by detector (19), thus changing the position of the rotor centre of mass relative to the rotational axis of the rotor.

The actuator (15) is joined by hinging pins (16 and 16a) to one of the plates of the hub (1) and to the mobile mass (22).

In this construction version the two plates of the hub (1) only show two opposing holes (23) located along the same axis X—X perpendicular to the rotational axis Y—Y of the rotor. The holes (23) house the pins (7a) located at the top of the mast (7).

What is claimed is:

1. Single-blade rotor for helicopters of the type comprising:
   a mast (7) with vertical rotation axis Y—Y provided with an opposing coaxial pair of pins (7a) along an axis X—X, orthogonal to the rotation axis Y—Y; the mast (7) having a top:
   a hub (1) of the rotor joined to the mast (7) and provided with a support (14) for a blade (8);
   a single blade (8)—operated by conventional means (10) connected to a suitable lever (9) of the blade (8)— joined to the support (14) by a pitch hinge that allows small rotations around the blade's longitudinal axis A—A;

a counterweight (13) made up of a profiled mass located at one end of an arm (12) which terminates, at the other end of the same arm, with a hub (11) of the counterweight (13) used to hinge the said counterweight to the hub (1) of the rotor, wherein said rotor rotates around an axis Y'—Y';

pins (6) for hinging the hub (11) of the counterweight (13) to the hub (1) of the rotor, wherein the joining of the centre of the pins (6) with the centre of mass of the counterweight (13) determines a direction C—C. characterized by the fact that:

a) the hub (1) of the rotor can rotate around the axis X—X;

b) the hub (11) of the counterweight (13) is hinged to the hub (1) of the rotor with the possibility of oscillation, with friction, around an axis W—W parallel to the axis X—X, underlying it;

c) the inclination of the hub (1) of the rotor around the axis X—X—caused by a variation of the blade's coning angle β—does not determine the corresponding inclination of the counterweight (13), whose rotation plane remains orthogonal to the rotation axis Y'—Y' of the rotor;

d) means for causing the displacement of the rotor centre of mass with respect to the rotation axis Y'—Y' and along the direction C—C according to the inclination of the hub (1) of the rotor around the axis X—X with subsequent balance of the lift component—normal to the rotation axis of the rotor Y'—Y'—of the blade (8) and the inertial forces;

e) friction devices positioned between the hub (1) of the rotor and the hub (11) of the counterweight (13) assure that the inclination of the rotation plane of the blade (8) around the axis X—X—caused by a cyclic variation of the pitch of the blade (8)—determines a simultaneous corresponding inclination of the rotation plane of the counterweight (13), with subsequent inclination of the rotation axis Y'—Y' of the rotor.

2. Single-blade rotor for helicopters, according to claim 1, characterized by the fact that the means for displacement of the rotor centre of mass with respect to the rotation axis Y'—Y' comprise a cylindrical body (2) having a longitudinal axis R—R parallel to the axis X—X; said cylindrical body (2) is housed in the hub (1) of the rotor and is free to rotate around the axis X—X and features a deep hollow, into which the top of the mast (7) is inserted, and an opposing coaxial pair of pins (7a) housed in two corresponding eccentric holes (2a) of the cylindrical body (2); means being provided that determine the rotation of the cylindrical body (2) inside the hub (1) of the rotor and around the axis W—W with subsequent displacement of the rotor centre of mass along the direction C—C.

3. Single-blade rotor for helicopters, according to claim 2, characterized in that the mans that determine the rotation of the cylindrical body (2) inside the hub (1) of the rotor and around the axis W—W comprise:

revolving cylinders (3) housed in an opposing coaxial second pair of eccentric holes (2b) located on the cylindrical body (2);

levers (5) located on the hub (11) of the counterweight (13) and fixed to the cylinders (3) by means of eccentric pins (4);

the pins (6) for hinging the hub (11) of the counterweight (13) to the hub (1) of the rotor.

4. Single-blade rotor for helicopters, according to claim 2, characterized in that the means that determine the rotation of the cylindrical body (2) inside the hub (1) of the rotor and around the axis W—W comprise:

an electromechanical actuaor (15) having actual movements and having hinging pins (16 and 17) respectively joined to the hub (1) of the rotor and to the cylindrical body (2);

a telescopic device for linear detection (19) being hinged at one end (21) to the hub (1) of the rotor and at the other end, to the hub (11) of the counterweight (13) the hinging pin at the end (20) of the telescopic device is eccentric with respect to the hinging pin of the hub (11) of the counterweight (13);

a control box (18) that controls the actuator (15) according to the distance between the two opposite ends (20 and 21) of the telescopic device (19) distance which is detected and transmitted by the telescopic device (19) itself;

wherein an upwards inclination of the hub (1) of the rotor—determined by the lift of the blade (8)—around the axis X—X and with respect to the counterweight (13), causes a variation of the distance between the two opposite ends (20 and 21) of the telescopic device (19); said variation, by means of the control box (18), determines corresponding displacements of the hinging pin (17) of the actuator (15) with respect to the hinging pin (16) of the actuator (15) and subsequent rotations of the cylindrical body (2) that cause the displacement of the rotor centre of mass relative to the rotation axis Y'—Y' of the rotor;

the control box (18) is made—such that a univocal angular position of the cylindrical body (2) determined by the actuator (15) that operates the variation of the distance between the hinging pins (16 and 17) of the actuator (15) corresponds to each value of the coning angle β.

5. Single-blade main rotor for helicopters, according to claim 1, characterized in that the means provided to cause displacement of the rotor centre of mass with respect to rotation axis Y'—Y' comprise:

a mobile mass (22) that slides on the arm (12) of the counterweight (13);

an electromechanical actuator (15) having axial movement and, having hinging pins (16 and 16a) respectively joined to the hub (1) of the rotor and to the mobile mass (22);

a telescopic device for linear detection (19) being hinged at one end (21) to the hub (1) of the rotor and at the other end to the hub (11) of the counterweight (13) the hinging pin at the end (20) of the telescopic device (19) is eccentric with respect to the hinging pin of the hub (11) of the counterweight (13);

a control box (18), that controls the actuator (15) according to the distance between the two opposite ends (20 and 21) of the telescopic device (19), distance which is detected and transmitted by the telescopic device (19) itself;

wherein an upwards inclination of the hub (1) of the rotor—determined by the lift of the blade (8)—around the axis X—X and with respect to the counterweight (13), causes a relative displacement between the two opposite ends (20 and 21) of the telescopic device (19) that, by means of the control box (18), determines corresponding displacements of the hinging pins (16 and 16*a*) of the actuator (15) with subsequent displacement of the mobile mass (22) and of the rotor centre of mass with respect to the rotation axis Y'—Y' of the rotor.

6. Single-blade rotor for helicopters, according to claim 2 characterized in that the hub (1) of the rotor is composed of an opposing pair of symmetrical plates (1*a* and 1*b*)—joined to each other by the support (14)—featuring one opposing pair of holes (1*c*) and a second opposing pair of holes (1*d*), where the first pair of holes (1*c*) houses the cylindrical body (2), while the second pair of holes (1*d*) houses the hinging pins (6) of the hub (11) of the counterweight (13).

\* \* \* \* \*